United States Patent [19]

Leyden

[11] Patent Number: 5,246,183
[45] Date of Patent: Sep. 21, 1993

[54] SECURITY DEVICE FOR A HAND-HELD REMOTE CONTROL

[75] Inventor: Roger J. Leyden, Willow Springs, Ill.

[73] Assignee: Se-Kure Controls, Chicago, Ill.

[21] Appl. No.: 680,536

[22] Filed: Apr. 4, 1991

[51] Int. Cl.⁵ .............................................. B65H 75/48
[52] U.S. Cl. ..................................................... 242/107
[58] Field of Search ................. 242/107, 107.6, 107.7, 242/100, 100.1, 107.1, 107.11, 107.12, 96

[56] References Cited

U.S. PATENT DOCUMENTS

| | | | |
|---|---|---|---|
| 665,800 | 1/1901 | Reno | 242/107.7 |
| 1,133,471 | 3/1915 | Harper | 242/107 |
| 3,093,341 | 6/1963 | Meletti | 242/107 |
| 3,337,155 | 8/1967 | Binding | 242/107 |
| 4,114,736 | 9/1978 | Scherenberg | 242/107.6 X |
| 4,146,191 | 3/1979 | Cavanaugh | 242/107 |
| 4,697,537 | 10/1987 | Smith | 242/107 X |
| 4,735,377 | 4/1988 | Zuehsow | 242/107 |
| 4,913,319 | 4/1990 | Root | 242/107 X |

Primary Examiner—John M. Jillions
Attorney, Agent, or Firm—Wood, Phillips, VanSanten, Hoffman & Ertel

[57] ABSTRACT

A security device for a portable hand-held control for operating an electronic device from a location remote from the electronic device. The security device consists of a housing, an elongate flexible element, structure for attaching one part of the elongate flexible element to a hand-held remote control, structure on the housing for a) normally urging the flexible element part towards a first position in which the flexible element part is in a first relationship with the housing and b) allowing the flexible element part to be drawn away from the housing to be spaced a distance from the housing that is greater than that with the flexible element part in the first position.

24 Claims, 2 Drawing Sheets

FIG. 6

SECURITY DEVICE FOR A HAND-HELD REMOTE CONTROL

BACKGROUND OF THE INVENTION

1. Field of the Invention

This invention relates to security devices and, more particularly, to a device for attachment to a conventional-type hand-held remote control to allow the remote control to be manipulated conveniently by a user while prohibiting unauthorized removal of the remote control from the premises.

2. Background Art

Hand-held remote controls have enjoying increased popularity in the electronics field. Remote controls are commonly employed with stereo equipment, televisions, and the like.

While remote controls have become a great convenience to consumers, they have also presented a serious problem to purveyors of electronics. The compact size of the remote controls makes them particularly vulnerable to theft. This is particularly true given the conventional layout of electronic stores.

Typically, vertically spaced shelves are lined with television sets, with most sets having an associated remote control. There may be literally hundreds of the remote controls accessible to the consuming public in a single store. It is quite simple for a thief to drop the remote control in a pocket or handbag and walk out of the store undetected.

The same problem is dealt with by motel/hotel operators. For the convenience of the clientele, television remote controls are commonly provided to facilitate operation of the television set from the beds. In the absence of some security device, the motel/hotel patron can easily pack away the remote control in his or her luggage upon departing.

The problem with theft has recently been aggravated by the construction of remote controls for a more universal function. That is, some remote controls are programmable to operate a wide range of equipment.

One solution to the theft of remote controls in hotels/motels has been to require a deposit for the use of the remote control by the patron. This is a considerable inconvenience to both the hotel/motel operator and the clientele.

Another solution to the above problem has been to anchor the remote control to the nightstand in the hotel/motel so that only pivoting movement of the remote control relative to an anchoring member is permitted. This is a problem in that anchoring of the remote control to a certain extent defeats its primary purpose - convenient operation of the television from any of a number of remote locations in the room. The user is required to lean over the nightstand to operate the remote control and must line the remote control up with the television set without obstructing the line of the signal between the remote control and the television set. The remote control is often inconveniently located so that it is difficult for the user to identify the particular buttons on the remote control to effect the desired operation of the television set. This same type of system has been employed in some retail establishments with the same shortcomings.

Some electronic stores will keep remote controls off of the store shelves to solve the theft problem. However, some electronics are operable only through a remote control and thus precluding access to the remote control precludes the potential customer from operating the electronics on site. Potential purchasers commonly wish to operate electronics through the full range of functions before deciding upon whether or not to make a purchase. Accordingly, precluding access to the remote control may result in lost sales to the store owner.

A further alternative is to employ relatively expensive electronic security devices on each control. However, some of these systems are sufficiently expensive that they are not cost justifiable given the relative inexpensive nature of the remote controls. Nonetheless, when remote control theft occurs on a large scale, it becomes a considerable expense to store operators, which loss may be ultimately passed on to the consumer through an increase in the price of the goods.

SUMMARY OF THE INVENTION

The present invention is specifically directed to overcoming the above-enumerated problems in a novel and simple manner.

According to the present invention, a security device is provided for a portable hand-held control for operating an electronic device from a location remote from the electronic device. The security device consists of a housing, an elongate flexible element, structure for attaching one part of the elongate flexible element to a hand-held remote control, structure on the housing for a) normally urging the flexible element part towards a first position in which the flexible element part is in a first relationship with the housing and b) allowing the flexible element part to be drawn away from the housing to be spaced a distance from the housing that is greater than that with the flexible element part in the first position.

With the above structure, a user can grasp and pull on a hand held remote control attached to the one part of the flexible element and place the hand-held remote control in a desired comfortable operating position for the user relative to the electronic device operated by the remote control. The flexible element allows convenient repositioning of the remote control by the user. The length of the flexible element can be selected depending upon the particular environment. While convenient operation through the remote control is facilitated with the present invention, the remote control cannot be moved beyond the range of the flexible element.

Preferably, the flexible element is a cable.

In a preferred form, there is a spool for the flexible cable on the housing with the spool normally urged to wrap the cable therearound. A recoil spring may be provided to normally urge the spool in a first direction of rotation to effect wrapping of the cable.

The housing is provided with structure to facilitate its mounting to a support surface. In one form of the invention, a flange is provided on the housing with at least one opening therein to accept conventional-type fasteners, such as screws and nails.

The invention also contemplates the combination of the above structure with a hand-held remote control.

In a preferred form, the hand-held remote control has a flat surface and the structure to attach the remote control to the flexible element is disc-shaped with a flat surface to be facially engaged with the flat surface on the remote control. The flat surfaces on the remote control and disc-shaped element can be bonded together, as through an adhesive.

The invention also contemplates the combination of the security device with a support shelf with opposite sides and first and second oppositely facing surfaces. A bore is provided through the shelf which is large enough to pass the flexible element but small enough that the hand-held remote control cannot pass therethrough. Accordingly, the housing can be placed on one side of the support shelf with the hand-held remote control on the other side thereof and the flexible element extending through the bore between the housing and remote control. This allows the remote control to rest normally on a shelf surface which supports an electronic device that is operable by the remote control. The user can then conveniently draw the remote control upwardly and outwardly to effect operation of the electronic device.

Alternatively, the housing can be mounted elsewhere on the shelf, such as on a vertically extending, peripheral edge associated with the shelf.

The invention also contemplates a security device consisting of a housing defining an internal space, a spool mounted for rotation within the internal housing space and biased for rotation in a first direction within the internal housing space about an axis, an elongate flexible element with spaced ends, structure for attaching one of the spaced ends to the spool so that as the spool rotates in the first direction the elongate flexible element wraps around the spool, with the elongate flexible element projecting from the spool outwardly through the housing to expose the other flexible element end outside of the housing, and structure on the other flexible element end for attaching a remote control thereto. The flexible element is selectively retractable within the internal housing space to a first position and extendable to a second position. The structure for attaching the remote control is positionable at a location spaced from the housing by a distance that is greater with the flexible element in its second position than in its first position.

In a preferred form, the spool biasing structure is a coil spring with a plurality of radially spaced turns. In a preferred form, the axis of the coil spring is parallel to and spaced from the rotational axis of the spool.

To mount the coil spring in a preferred form, a cup-shaped seat is provided on the housing with an opening through the seat to allow the coil spring to project out of the seat to be connected to the spool.

Preferably, the housing is defined by first and second joinable parts, with one of the first and second housing parts defining the cup-shaped seat and the other of the first and second parts defining a blocking element which blocks the coil spring in the cup-shaped seat with the first and second housing parts operatively connected.

In a preferred form, the coil spring has a free end that is removably connected to the spool without the use of fasteners. This facilitates assembly and disassembly of the device.

In a preferred form, the spool has axially spaced flanges defining a storage space for the flexible element and a hub, spaced axially from the storage space, to which the coil spring free end is attached.

DETAILED DESCRIPTION OF THE DRAWINGS

Figures 1, 2, 3, 4, 5:
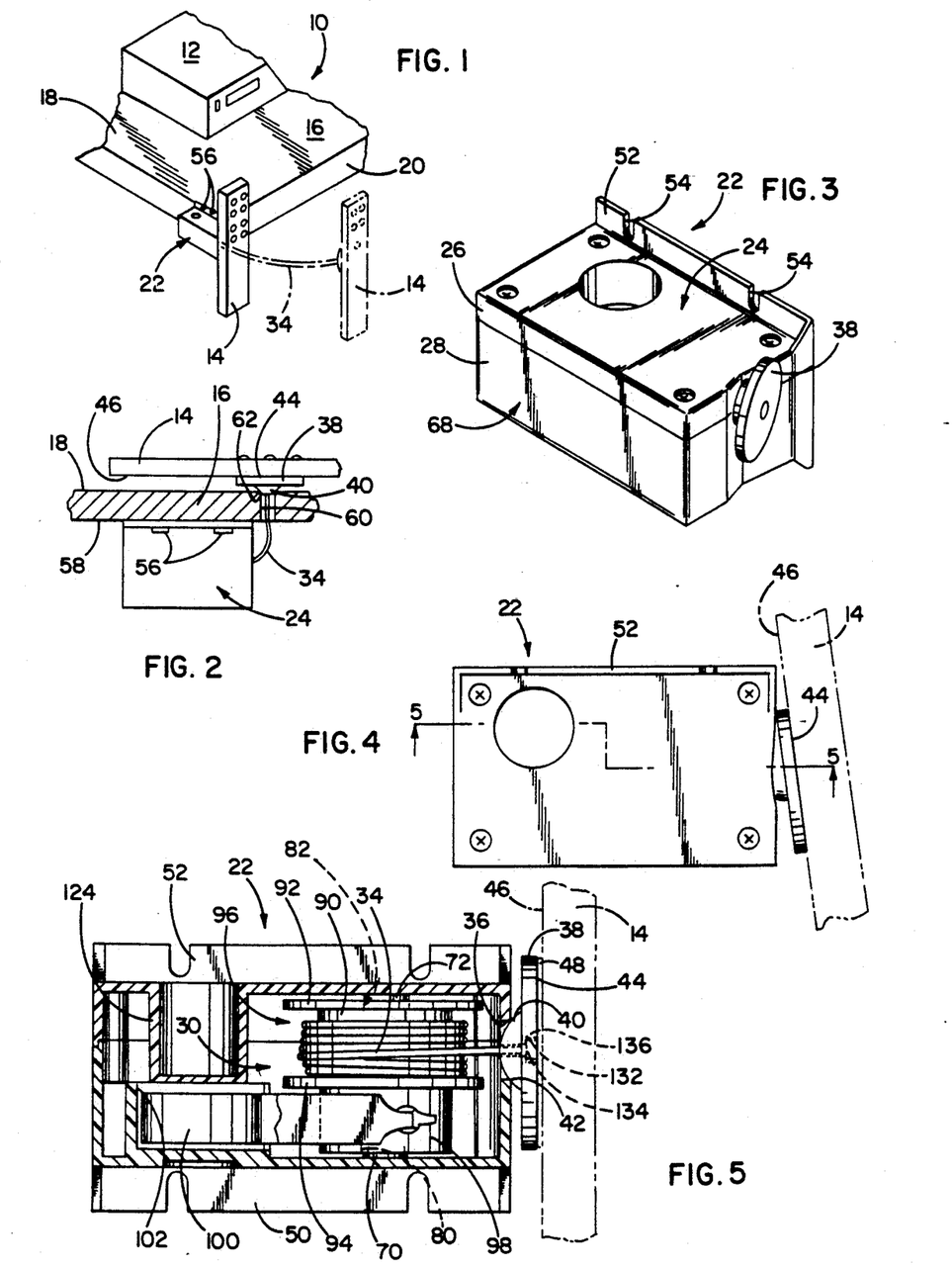
FIG. 1 is a partial perspective view of a shelf with an electronic device thereon, a remote control for operating the electronic device and a security device according to the present invention attached to the remote control for allowing movement of the remote control from the solid line position of FIG. 1 to the phantom line position.
FIG. 2 is a cross-sectional view of a shelf showing an alternative mounting arrangement for a remote control using the security device according to the present invention.
FIG. 3 is an enlarged perspective view of a remote control security device according to the present invention without the remote control attached thereto.
FIG. 4 is a side elevation view of the security device with a remote control attached thereto and shown in phantom.
FIG. 5 is a sectional view of the security device taken along line 5—5 of FIG. 4.
Figure 6:
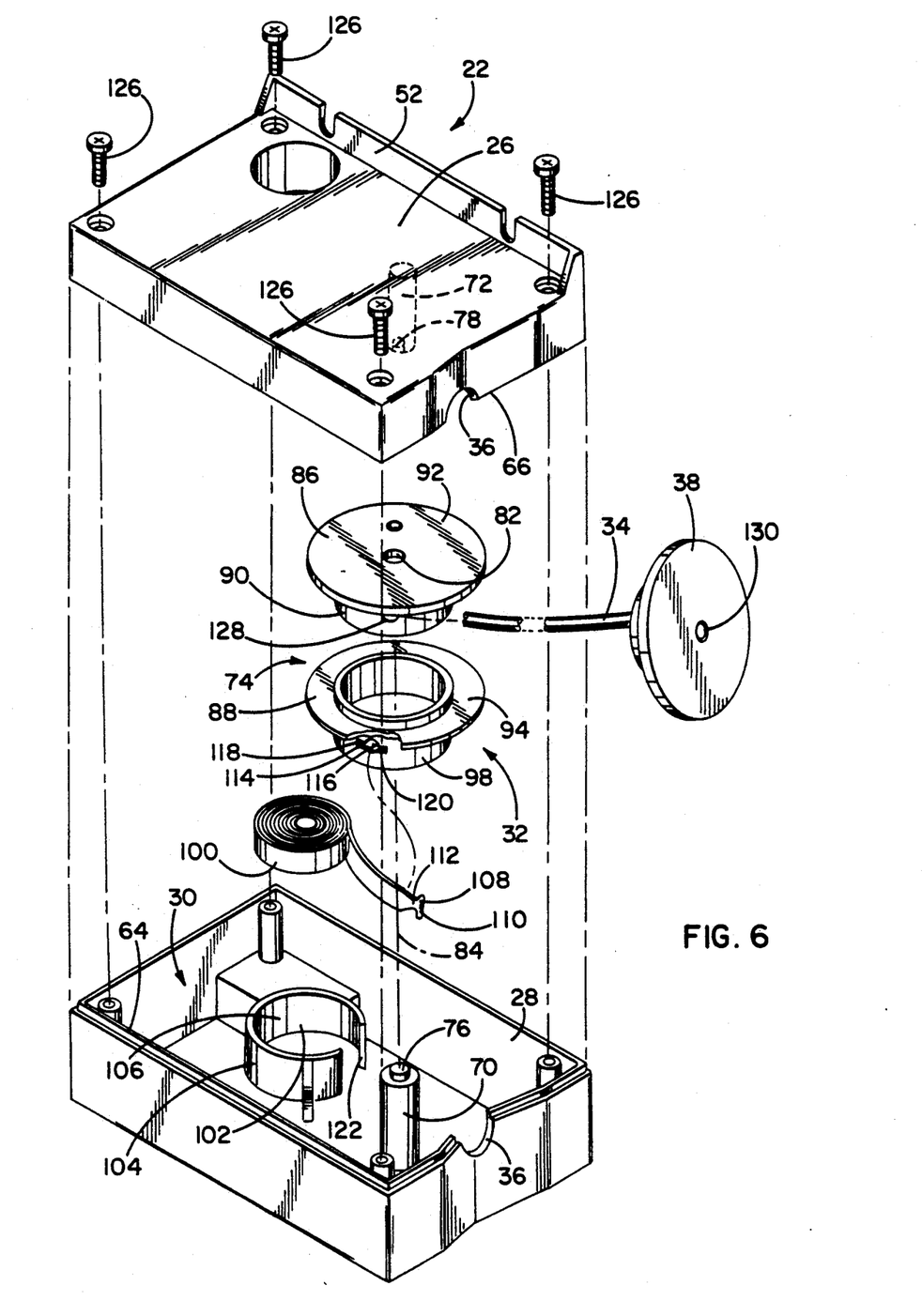
FIG. 6 is an exploded perspective view of the security device without an associated remote control.

In FIG. 1, a typical point of purchase display is shown at 10 for an electronic device 12 which is operable through a portable, hand-held control 14 from a location remote from the device 12. A display shelf 16 defines an upwardly facing surface 18 for supporting the device 12. The shelf 16 has a peripheral, vertically extending edge 20 to which the remote control 14 is attached through a security device at 22, according to the present invention. The security device 22 is designed to allow free movement of the remote control 14 thereon from the stored/solid line position of FIG. 1, to the phantom position in FIG. 1, wherein it can be conveniently manipulated by the consumer.

The details of the security device 22 are shown in FIGS. 3-6. The security device 22 consists of a rectangular housing 24 defined by first and second joinable housing parts 26, 28, respectively. The housing parts 26, 28, operatively connected as in FIGS. 3-5, define an internal space 30 for a recoil/storage mechanism at 32 for a flexible cable 34.

The flexible cable 34 extends from the recoil/storage mechanism 32 outwardly through an opening 36 in the housing 24 for connection to the remote control 14 through an attaching disk 38. The attaching disk 38 is movable between the first position, in FIGS. 3-5, wherein the cable 34 is fully retracted into the housing 24, and a second position, shown in phantom lines in FIG. 1, wherein the cable 34 is drawn out of the housing. In the first position for the attaching disk 38, a rounded dimple 40 thereon bears on a peripheral edge 42, bounding the housing opening 36, to arrest further retraction of the cable 34 into the housing 24.

The attaching disk 38 is fixedly attached to the remote control 14. More specifically, the attaching disk 38 has an enlarged, flat surface 44 to facially engage a flat surface 46 on the remote control 14. The surfaces 44, 46 can be fixed, one to the other, as by an adhesive. An adhesive pad 48 is shown in FIG. 5 to effect the connection between the remote control 14 and attaching disk 38.

With the remote control 14 attached to the disk 38, movement of the remote control 14 away from the housing 24 is limited to a distance determined by the length of the cable 34. By attaching the housing 24 to a suitable support surface, security is assured while allowing the flexibility of using the remote control 14 in its normal manner. To facilitate anchoring of the housing 24, flanges 50, 52 are integrally formed thereon and have openings 54 therein to accept conventional fasteners, such as screws and nails 56 (FIG. 1).

In FIG. 2, an alternative mounting location is shown for the housing with respect to the shelf 16. The shelf 16 has a surface 58 facing downwardly and oppositely to the surface 18. The housing 24 is mounted to the surface 58, as shown in FIG. 2 through the fasteners 56. The cable 34 extends upwardly through a bore 60 in the shelf 16. The attaching disk 38 is secured to that part of the cable 34 projecting upwardly through the shelf 16. The bore 60 is dimensioned so that the remote control 14 cannot be passed downwardly therethrough. The recoil/storing mechanism 32 draws the cable 34 into the housing 24 so as to bear the dimple 40 on the disc 38 against a peripheral seat 62 bounding the bore 60 to maintain the remote control 14 in a generally horizontal position spaced slightly above the upwardly facing shelf surface 18, as shown in FIG. 2. This facilitates grasping of the remote control by the user and keeps the housing 24 out of sight, primarily for purposes of aesthetics.

The invention also contemplates a structure that, while highly effective, is relatively inexpensive and easy to assemble. The housing parts 26, 28 are preferably molded of plastic with an integral peripheral, inset rib 64 on the housing part 28 to be closely surrounded by a peripheral rib 66 on the housing part 26 to define a smooth peripheral wall 68 on the housing 24.

The housing part 26 has a post part 70 which engages a post part 72 on the housing part 26 to together define a support post for a spool assembly 74 for the cable 34. The post part 70 has a projection 76 which seats in a correspondingly configured recess 78 at the free end of the post part 72 with the housing parts 26, 28 operatively connected. The joined post parts 70, 72 are closely received within spaced bores 80, 82 on the spool assembly 74, to define a rotational axis 84 therefor.

The spool assembly 74 consists of first and second joinable parts 86, 88, which are connected together as by an adhesive so as to define a hub 90 with axially spaced flanges 92, 94 thereon defining a cable storage space 96. The hub 90 has a part 98 spaced axially from the storage space 96 to which a coil spring 100 is attached to bias the spool assembly 74 in a first direction to thereby cause the cable to be wrapped on the spool hub 90.

The spring 100 is placed during assembly in a cup-shaped seat 102 defined by a circular wall 104 formed integrally on the housing part 28. The coil spring 100 has a plurality of radially spaced turns which are wound in a cylindrical shape with a diameter slightly less than the diameter of the inside surface 106 of the circular wall 104. The free end 108 of the spring 100 has a "T" shape with a cross bar 110 and stem 112. The free spring end 108 is removably connected to the hub part 98, which has a receptive opening 114 defined by a center bore 116 with slots 118, 120 extending peripherally away from the center bore 116. The free end 108 of the spring 100 can be directed radially through the opening 114 by aligning the cross bar 110 for passage through the slots 118, 120. Once the cross bar 110 is extended fully through the opening 114, the end 108 can be turned by 90°, which is permitted by the center bore 116 that has a diameter at least equal to the width of the stem 112.

The invention contemplates that the spool assembly 74 be attached to the housing 24 with the coil spring 100 preassembled thereon. By a simple press and turn fitting of the coil spring end 108, the assembly of the coil spring 100 to the spool assembly 74 is effected. As the spool assembly 74 is directed operatively onto the post part 70, the coil spring 100 moves into the seat 102. An opening 122 is provided in the wall 104 to allow passage of the spring 100 therethrough. The opening 122 has a width that is less than the diameter of the coil spring 100 with the cable 34 fully extended so that the coil spring cannot pass therethrough in operation. As the cable 34 is extended, the spool assembly 74 rotates in one direction and unwinds the coil spring 100 so that a restoring force is developed to urge the spool in rotation oppositely to the one direction.

The housing part 26 has an integral blocking element 124 which, with the housing parts 26, 28 assembled, extends up to the seat 102 to prevent the coil spring 100 from coming out of the seat 102.

Thus, assembly is readily and simply effected by placing the spool assembly 74 on the post part 70 and joining the housing parts 26, 28, which directs the spool part 72 into the spool assembly 74 and situates the blocking element 124 over the seat 102. The connection between the housing parts 26, 28 is secured by bolt screws 126.

The housing end of the cable 34 can be preassembled to the spool assembly 74. The housing end of the cable 34 can be directed radially through the bore 128 on the hub 90 and outwardly through the larger bore 82 on the flange 92 to allow a connector to be crimped thereon to prevent passage back through the bore 128. The opposite end 130 of the cable 34 is extended through a stepped through bore 132 in the disk 38 to allow a connector 134 to be crimped thereon. The connector 134 abuts a shoulder 136 to prevent the connector 134 from being withdrawn back through the bore 132.

With the above structure, it can be seen that consumers can conveniently grasp the remote control 14 and operate it in normal manner. At the same time, the merchant is afforded the security of knowing that the remote control 14 cannot be removed from the premises. The device can be made sufficiently low in cost that it can be affordably purchased and used for even low price remote controls.

The foregoing disclosure of specific embodiments is intended to be illustrative of the broad concepts comprehended by the invention.

I claim:

1. In combination:
a portable hand-held remote control for an electronic device;
a housing;
an elongate flexible element;
means for attaching one part of the elongate flexible element to the hand-held remote control,
said attaching means comprising a disc-shaped element with a surface to engage the hand-held remote control and means for connecting the disc-shaped element surface to the hand-held remote control;
first means on the housing for a) normally urging the flexible element part towards a first position in which the flexible element part is in a first relationship with the housing and b) allowing the flexible element part to be drawn away from the housing to be spaced a distance from the housing that is greater than that with the flexible element part in the first position; and
a protrusion on one of the disc-shaped element and housing to maintain the remote control spaced from the housing with the flexible element part in its first position, whereby a user can grasp and pull on the hand-held remote control attached to the one part of the flexible element to place the hand-held remote control in a desired comfortable operating position for the user relative to an electronic device operated by the hand-held remote control.

2. The combination according to claim 1 wherein the elongate flexible element comprises a flexible cable.

3. The combination according to claim 1 inducing a spool on the housing and the first means comprises means for normally urging the flexible element into a wrapped position around the spool.

4. The combination according to claim 3 wherein said first means includes second means for normally urging the spool to be rotated relative to the housing to thereby wrap the flexible element around the spool.

5. The combination according to claim 3 wherein the second means comprises a coil spring.

6. The combination according to claim 3 wherein said housing defines an internal space, the spool is mounted within the internal housing space and means are provided for attaching the housing to a support surface for the security device.

7. The combination according to claim 6 wherein the attaching means comprises an elongate flange on the housing and an opening in the flange to facilitate securing of the flange to a support surface.

8. The combination according to claim 1 wherein the hand-held remote control has a first flat surface and the disc-shaped element surface is flat to be facially engaged in an operative position with the first flat surface.

9. The combination according to claim 8 wherein the connecting means comprises an adhesive.

10. The combination according to claim 1 further in combination with a support shelf having an upwardly facing first surface for supporting an electronic device to be controlled by the hand-held remote control and a vertically extending edge and the housing is an enclosed, self-contained unit that is connected to the vertically extending support shelf edge.

11. In combination:
a portable hand-held remote control for an electronic device;
a housing;
an elongate flexible element;
means for attaching one part of the elongate flexible element to the hand-held remote control,
said attaching mans comprising a disc-shaped element with a surface to engage the hand-held remote control and means for connecting the disc-shaped element surface to the hand-held remote control; and
first means on the housing for a) normally urging the flexible element part towards a first position in which the flexible element part is in a first relationship with the housing and b) allowing the flexible element part to be drawn away from the housing to be spaced a distance from the housing that is greater than that with the flexible element part in the first position,
whereby a user can grasp and pull on the hand-held remote control attached to the one part of the flexible element to place the hand-held remote control in a desired comfortable operating position for the user relative to an electronic device operated by the hand-held remote control,
wherein the hand-held remote control has a first flat surface, the attachment means comprises an element with a second flat surface to be facially engaged in an operative position with the first flat surface, means are provided for holding the first and second flat surfaces together in an operative position and the element has a dimple thereon to maintain the hand-held remote control spaced from the housing with the flexible element part in a first position.

12. The combination according to claim 11 wherein the dimple has a curved surface to bear against the housing and allow guided pivoting relative thereto.

13. In combination:
a portable hand-held remote control for an electronic device;
a housing;
an elongate flexible element;
means for attaching one part of the elongate flexible element to the hand-held remote control,
said attaching means comprising a disc-shaped element with a surface to engage the hand-held remote control and means for connecting the disc-shaped element surface to the hand-held remote control; and
first means on the housing for a) normally urging the flexible element part towards a first position in which the flexible element part is in a first relationship with the housing and b) allowing the flexible element part to be drawn away from the hosing to be spaced a distance from the housing that is greater than that with the flexible element part in the first position,
whereby a user can grasp and pull on he hand-held remote control attached to the one part of the flexible element to place the hand-held remote control in a desired comfortable operating position for the user relative to an electronic device operated by the hand-held remote control,
wherein the housing is a self-contained closed unit and further in combination with a support shelf, separate from the housing, with opposite sides and first and second oppositely facing surfaces, there being a bore through the shelf, said bore being large enough to pass the flexible element therethrough but sufficiently small that the hand-held remote control cannot pass therethrough, wherein the housing is placed on one side of the support shelf with the flexible element extending through the shelf bore.

14. The combination according to claim 13 wherein the housing is secured to the first shelf surface and the hand-held remote control is normally urged by the first means against the second shelf surface.

15. A security device for a portable, hand-held control for operating an electronic device from a location remote from the electronic device, said security device comprising:
a housing defining an internal space;
a spool;
means for mounting the spool for rotation within the internal housing space;
means for biasing the spool for rotation in a first direction within the internal housing space about an axis;
an elongate flexible element having spaced ends;
means for attaching one of the spaced flexible element ends to the spool so that as the spool rotates in the first direction the elongate flexible element wraps around the spool, said elongate flexible element projecting from the spool outwardly through the housing to expose the other flexible element end outside of the housing; and second means on the other flexible element end for attachment to a portable hand-held remote control, said flexible element being selectively retractable within the internal housing space to a first position and extendable to a second position, said second attaching means being positionable at a location spaced from the housing by a distance that is greater with the flexible element in its second position than in its first position, said attachment means including a dimple to abut the housing and maintain a hand-held remote control on said attachment means spaced from the housing with the elongate flexible element in its first position.

16. The security device for a hand-held remote control according to claim 15 wherein the spool biasing means comprises a coil spring, the attachment means including a disc-shaped element with the dimple being integrally formed therewith.

17. The security device for a hand-held remote control according to claim 16 wherein the coil spring has a center axis with a plurality of radially spaced turns and means are provided for mounting the coil spring to the housing with the axis of the coil spring generally parallel to and spaced from the spool axis.

18. The security device for a hand-held remote control according to claim 17 wherein the coil spring mounting means comprises a cup-shaped seat for the coil spring with an opening in the cup-shaped seat to allow the coil spring to project out of the cup-shaped seat to be connected to the spool.

19. The security device for a hand-held remote control according to claim 15 wherein the means for attaching a portable hand-held remote control on the flexible element comprises a mounting disc that is bondable to a portable hand-held remote control.

20. The combination according to claim 19 wherein the dimple has a curved surface to allow the disc to pivot relative to the housing with the dimple abutted thereto and the flexible element in its first position.

21. The security device for a hand-held remote control according to claim 15 in combination with a portable hand-held remote control and a support shelf having opposite sides with first and second oppositely facing surfaces, there being a bore through the shelf, said bore being large enough to pass the flexible element therethrough but sufficiently small that the hand-held remote control cannot pass therethrough, whereby the housing is placed on one side of the support shelf and the hand-held remote control on the other side of the support shelf with the flexible element extending through the shelf bore.

22. A security device for a portable, hand held remote control for operating an electronic device from a location remote from the electronic device, said security device comprising:

a housing defining an internal space;

a spool;

means for mounting the spool for rotation within the internal housing space;

means for biasing the spool for rotation in a first direction within the internal housing space about an axis;

an elongate flexible element having spaced ends;

means for attaching one of the spaced flexible element ends to the spool so that as the spool rotates in the first direction the elongate flexible element wraps around the spool, said elongate flexible element projecting from the spool outwardly through the housing to expose the other flexible element end outside of the housing; and second means on the other flexible element end for attaching a portable hand-held remote control, said flexible element being selectively retractable within the internal housing space to a first position and extendable to a second position, said second attaching means being positionable at a location spaced from the housing by a distance that is greater with the flexible element in it second position that in it s first position, wherein the spool biasing means comprises a coil spring, wherein the coil spring has a central axis with a plurality of radially spaced turns ad means are provided for mounting the coil spring to the housing with the axis of the coil spring generally parallel to and spaced from the spool axis, wherein the coil spring mounting means comprises a cup-shaped seat for the coil spring with an opening in the sup-shaped seat to allow the coil spring to project out of the cup-shaped seat to be connected to the spool, wherein the housing is defined by joinable first and second parts, one of the first and second housing parts defines the cup-shaped seat and the other of the first and second housing parts has a blocking element, which, with the first and second housing parts joined in an operative position, blocks the coil spring in the cup-shaped seat.

23. The security device for a hand-held remote control according to claim 22 wherein the coil spring has a free end and there are cooperating means on the coil spring free end and spool for removably connecting the free end of the coil spring to the spool without the use of fasteners.

24. The security device for a hand-held remote control according to claim 23 wherein the spool has axially spaced flanges defining a storage space for the flexible element and an axially spaced hub to which the coil spring free end is attached.

* * * * *

REEXAMINATION CERTIFICATE (3210th)

United States Patent [19]

Leyden

[11] B1 5,246,183
[45] Certificate Issued Jun. 3, 1997

[54] SECURITY DEVICE FOR A HAND-HELD REMOTE CONTROL

[75] Inventor: Roger J. Leyden, Willow Springs, Ill.

[73] Assignee: Se-Kure Controls, Inc., Chicago, Ill.

Reexamination Request:
No. 90/004,020, Nov. 13, 1995

Reexamination Certificate for:
Patent No.: 5,246,183
Issued: Sep. 21, 1993
Appl. No.: 680,536
Filed: Apr. 4, 1991

[51] Int. Cl.⁶ ................................................ B65H 75/48
[52] U.S. Cl. ................................................ 242/375; 242/379
[58] Field of Search ............................ 242/373, 375, 242/376, 377, 379, 379.2, 380, 385.1, 385.2, 385.3, 385.4, 402, 406

[56] References Cited

U.S. PATENT DOCUMENTS

| 665,800 | 1/1901 | Reno . | |
|---|---|---|---|
| 1,133,471 | 3/1915 | Harper . | |
| 3,041,044 | 6/1962 | Nixon | 242/380 |
| 3,093,341 | 6/1963 | Meletti . | |
| 3,337,155 | 8/1967 | Binding . | |
| 4,114,736 | 9/1978 | Scherenberg . | |
| 4,146,191 | 3/1979 | Cavanaugh . | |
| 4,697,537 | 10/1987 | Smith . | |
| 4,719,992 | 1/1988 | Elward et al. | 242/373 |
| 4,735,377 | 4/1988 | Zuehsow . | |
| 4,913,319 | 4/1990 | Root . | |

FOREIGN PATENT DOCUMENTS 2128790  5/1984  United Kingdom .

OTHER PUBLICATIONS

U.S. Trademark Application for "Pullbox"—Reg. No. 1,588, 539 on Mar. 27, 1990 to Vulcan Spring & Mfg., pp. 38–39.

*Primary Examiner*—John M. Jillions

[57] ABSTRACT

A security device for a portable hand-held control for operating an electronic device from a location remote from the electronic device. The security device consists of a housing, an elongate flexible element, structure for attaching one part of the elongate flexible element to a hand-held remote control, structure on the housing for a) normally urging the flexible element part towards a first position in which the flexible element part is in a first relationship with the housing and b) allowing the flexible element part to be drawn away from the housing to be spaced a distance from the housing that is greater than that with the flexible element part in the first position.

B1 5,246,183

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 4, lines 41–52, lines 53–60:

The flexible cable 34 extends from the recoil/storage mechanism 32 outwardly through an opening 36 in the housing 24 for connection to the remote control 14 through an attaching disk 38. The attaching disk 38 *has oppositely facing surfaces and* is movable between the first position, in FIGS. 3–5, wherein the cable 34 is fully retracted into the housing 24, and a second position, shown in phantom lines in FIG. 1, wherein the cable 34 is drawn out of the housing. In the first position for the attaching disk 38, a rounded dimple 40 [thereon] *on one of the oppositely facing disk surfaces* bears on a peripheral edge 42, bounding the housing opening 36, to arrest further retraction of the cable 34 into the housing 24.

The attaching disk 38 is fixedly attached to the remote control 14. More specifically, the attaching disk 38 has an enlarged, flat surface 44 *on the other of the oppositely facing disk surfaces* to facially engage a flat surface 46 on the remote control 14. The surfaces 44, 46 can be fixed, one to the other, as by an adhesive. An adhesive pad 48 is shown in FIG. 5 to effect the connection between the remote control 14 and attaching disk 38.

Column 5, lines 28–36:

The housing part [26] *28* has a post part 70 which engages a post part 72 on the housing part 26 to together define a support post for a spool assembly 74 for the cable 34. The post part 70 has a projection 76 which seats in a correspondingly configured recess 78 at the free end of the post part 72 with the housing parts 26, 28 operatively connected. The joined post parts 70, 72 are closely received within spaced bores 80, 82 on the spool assembly 74, to define a rotational axis 84 therefor.

Column 6, lines 17–22, lines 23–33:

Thus, assembly is readily and simply effected by placing the spool assembly 74 on the post part 70 and joining the housing parts 26, 28 which directs the [spool] *post* part 72 into the spool assembly 74 and situates the blocking element 124 over the seat 102. The connection between the housing parts 26, 28 is secured by bolt screws 126.

The housing end of the cable 34 can be preassembled to the spool assembly 74. The housing end of the cable 34 can be directed radially through the bore 128 on the hub 90 and outwardly through the larger bore 82 on the flange 92 to allow a connector to be crimped thereon to prevent passage back through the bore 128. The opposite end 130 of the cable 34 is extended through a stepped through bore 132 in the disk 38 to allow a connector 134 to be crimped thereon. The connector 134 abuts a shoulder 136 to prevent the connector 134 from being withdrawn back through the bore 132. *This type of connection results in a portion of the cable 34 adjacent the disk 38 projecting away therefrom perpendicularly to the flat surface 44 of disk 38.*

AS A RESULT OF REEXAMINATION, IT HAS BEEN DETERMINED THAT:

Claim 19 is cancelled.

Claims 1, 3, 8, 11–13, 15–16, 20 and 22 are determined to be patentable as amended.

Claims 2, 4–7, 9–10, 14, 17–18, 21 and 23–24, dependent on an amended claim, are determined to be patentable.

New claim 25 is added and determined to be patentable.

1. In combination:
 a portable hand-held remote control for an electronic device;
 a housing;
 an elongate flexible element;
 means for attaching one part of the elongate flexible element to the hand-held remote control,
 said attaching means comprising a disc-shaped element *to which the elongate flexible element connects and having oppositely facing surfaces* with [a surface to engage] *one of the disc-shaped element surfaces facing in a first direction and having a substantial area which is facially engageable with a surface of* the hand-held remote control and means for connecting the *one* disc-shaped element surface to the hand-held remote control, *the one disc-shaped element surface being generally perpendicular to the length of the flexible element adjacent thereto*;
 first means on the housing for a) normally urging the flexible element part towards a first position in which the flexible element part is in a first relationship with the housing and b) allowing the flexible element part to be drawn away from the housing to be spaced a distance from the housing that is greater than that with the flexible element part in the first position; and
 a protrusion *that is a rounded dimple fixedly formed* on [one of] the *other* disc-shaped element [and housing] *surface and projecting from the other disc-shaped element surface oppositely to the first direction* to maintain the remote control spaced from the housing with the flexible element part in its first position,
 whereby a user can grasp and pull on the hand-held remote control attached to the one part of the flexible element to place the hand-held remote control in a desired comfortable operating position for the user relative to an electronic device operated by the hand-held remote control.

3. The combination according to claim 1 [inducing] *including* a spool on the housing and the first means comprises means for normally urging the flexible element into a wrapped position around the spool.

8. The combination according to claim 1 wherein the hand-held remote control has a first flat surface and the *one* disc-shaped element surface is flat to be facially engaged in an operative position with the first flat surface.

11. In combination:
 a portable hand-held remote control for an electronic device;

a housing;

an elongate flexible element;

means for attaching one part of the elongate flexible element to the hand-held remote control, said attaching [mans] *means* comprising a disc-shaped element *to which the elongate flexible element connects and having oppositely facing surfaces* with [a surface to engage] *one of the disc-shaped element surfaces facing in a first direction and having a substantial area which is facially engageable with* the hand-held remote control and means for connecting the *one* disc-shaped element surface to the hand-held remote control, *the one disc-shaped element surface being generally perpendicular to the length of the flexible element adjacent thereto;* and first means on the housing for a) normally urging the flexible element part towards a first position in which the flexible element part is in a first relationship with the housing and b) allowing the flexible element part to be drawn away from the housing to be spaced a distance from the housing that is greater than that with the flexible element part in the first position, whereby a user can grasp and pull on the hand-held remote control attached to the one part of the flexible element to place the hand-held remote control in a desired comfortable operating position for the user relative to an electronic device operated by the hand-held remote control, wherein the hand-held remote control has a first flat surface, the [attachment means comprises an element with a second] *one disc-shaped element surface is* flat [surface to be] *and* facially engaged in an operative position with the first flat surface, means are provided for holding the *one disc-shaped element and* first [and second] flat [surfaces] *surface* together in an operative position and the *disc-shaped* element has a dimple [thereon] *on the other disc-shaped element surface and projecting from the other disc-shaped element surface oppositely to the first direction* to maintain the hand-held remote control spaced from the housing with the flexible element part in a first position.

12. The combination according to claim 11 wherein the dimple has a curved surface to bear against the housing and allow guided pivoting relative thereto *with the flexible element part in the first position.*

13. In combination:

a portable hand-held remote control for an electronic device;

a housing;

an elongate flexible element;

means for attaching one part of the elongate flexible element to the hand-held remote control, said attaching means comprising a disc-shaped element *to which the elongate flexible element connects and having oppositely facing surfaces* with [a surface to engage] *one of the oppositely facing surfaces comprising an enlarged flat surface facing in a first direction to facially engage a flat surface on* the hand-held remote control and means for connecting the *one* disc-shaped element surface to the hand-held remote control, *the one disc-shaped element surface being generally perpendicular to the length of the flexible element adjacent thereto;* and first means on the housing for a) normally urging the flexible element part towards a first position in which the flexible element part is in a first relationship with the housing and b) allowing the flexible element part to be drawn away from the [hosing] *housing* to be spaced a distance from the housing that is greater than that with the flexible element part in the first position,

*there being a protrusion on the other disc-shaped element surface and projecting from the other disc-shaped element surface oppositely to the first direction to maintain the remote control spaced from the housing with the flexible element part in the first position,* whereby a user can grasp and pull on [he] *the* hand-held remote control attached to the one part of the flexible element to place the hand-held remote control in a desired comfortable operating position for the user relative to an electronic device operated by the hand-held remote control, wherein the housing is a self-contained closed unit and further in combination with a support shelf, separate from the housing, with opposite sides and first and second oppositely facing surfaces, there being a bore through the shelf, said bore being large enough to pass the flexible element therethrough but sufficiently small that the hand-held remote control cannot pass therethrough, wherein the housing is placed on one side of the support shelf with the flexible element extending through the shelf bore.

15. A security device for a portable, hand-held control for operating an electronic device from a location remote from the electronic device, said security device comprising:

a housing defining an internal space;

a spool;

means for mounting the spool for rotation within the internal housing space;

means for biasing the spool for rotation in a first direction within the internal housing space about an axis;

an elongate flexible element having spaced ends;

means for attaching one of the spaced flexible element ends to the spool so that as the spool rotates in the first direction the elongate flexible element wraps around the spool, said elongate flexible element projecting from the spool outwardly through the housing to expose the other flexible element end outside of the housing; and second means on the other flexible element end for attachment to a portable hand-held remote control, said flexible element being selectively retractable within the internal housing space to a first position and extendable to a second position, said second [attaching] *attachment* means being positionable at a location spaced from the housing by a distance that is greater with the flexible element in its second position than in its first position,

*said second attachment means comprising a mounting disc having oppositely facing surfaces with one of the oppositely facing surfaces comprising an enlarged surface facing in a first direction and facially engaged with a surface on the hand-held remote control,* said *second* attachment means including a *rounded* dimple *on the other mounting disc surface and projecting oppositely to the first direction* to abut the housing and maintain a hand-held remote control on said *second* attachment means spaced from the housing with the elongate flexible element in its first position.

16. The security device for a hand-held remote control according to claim 15 wherein the spool biasing means comprises a coil spring, [the attachment means including a disc-shaped element with] *and wherein* the dimple [being] *is* integrally formed [therewith] *as one piece with the mounting disc.*

20. The combination according to claim [19] *15* wherein the dimple has a curved surface to allow the *mounting* disc to *universally* pivot relative to the housing with the dimple abutted thereto and the flexible element in its first position.

22. A security device for a portable, [hand held] *hand-held* remote control for operating an electronic device from a location remote from the electronic device, said security device comprising:

a housing defining an internal space;

a spool;

means for mounting the spool for rotation within the internal housing space;

means for biasing the spool for rotation in a first direction within the internal housing space about an axis;

an elongate flexible element having spaced ends;

means for attaching one of the spaced flexible element ends to the spool so that as the spool rotates in the first direction the elongate flexible element wraps around the spool, said elongate flexible element projecting from the spool outwardly through the housing to expose the other flexible element end outside of the housing; and second means on the other flexible element end for attaching a portable hand-held remote control, said flexible element being selectively retractable within the internal housing space to a first position and extendable to a second position, said second attaching means being positionable at a location spaced from the housing by a distance that is greater with the flexible element in [it] *its* second position than in [it s] *its* first position,

*said second attaching means comprising a mounting disc to which the elongate flexible element connects and having oppositely facing surfaces with one of the oppositely facing surfaces including an enlarged flat surface facing in a first direction and facially engageable with a flat surface on the portable hand-held remote control and the other mounting disc surface including a rounded dimple projecting from the other mounting disc surface in a direction opposite to the first direction,* wherein the one mounting disc flat surface is generally perpendicular to the length of the flexible element adjacent thereto, wherein the spool biasing means comprises a coil spring, wherein the coil spring has a central axis with a plurality of radially spaced turns [ad] *and* means are provided for mounting the coil spring to the housing with the axis of the coil spring generally parallel to and spaced from the spool axis, wherein the coil spring mounting means comprises a cup-shaped seat for the coil spring with an opening in the [sup-shaped] *cup-shaped* seat to allow the coil spring to project out of the cup-shaped seat to be connected to the spool, wherein the housing is defined by joinable first and second parts, one of the first and second housing parts defines the cup-shaped seat and the other of the first and second housing parts has a blocking element, which, with the first and second housing parts joined in an operative position, blocks the coil spring in the cup-shaped seat.

25. *In combination:*

*a portable hand-held remote control for an electronic device;*

*a housing;*

*an elongate flexible element;*

*means for attaching one part of the elongate flexible element to the hand-held remote control,*

*said attaching means comprising a disc-shaped element with a first flat surface to engage the hand-held remote control and means for connecting the disc-shaped element surface to the hand-held remote control; and*

*first means on the housing for a) normally urging the flexible element part towards a first position in which the flexible element part is in a first relationship with the housing and b) allowing the flexible element part to be drawn away from the housing to be spaced a distance from the housing that is greater than that with the flexible element part in the first position,*

*whereby a user can grasp and pull on the hand-held remote control attached to the one part of the flexible element to place the hand-held remote control in a desired comfortable operating position for the user relative to an electronic device operated by the hand-held remote control,*

*wherein the hand-held remote control has a second flat surface, the first flat surface faces in a first direction and has a substantial area to be facially engaged in an operative position with the second flat surface, means are provided for holding the first and second flat surfaces together in an operative position and the disc-shaped element has a third surface facing oppositely to the first direction with there being a dimple projecting from the third surface oppositely to the first direction to maintain the hand-held remote control spaced from the housing with the flexible element part in a first position,*

*wherein the dimple has a curved surface to bear against the housing and allow guided pivoting relative thereto.*

\* \* \* \* \*